Figure 1:
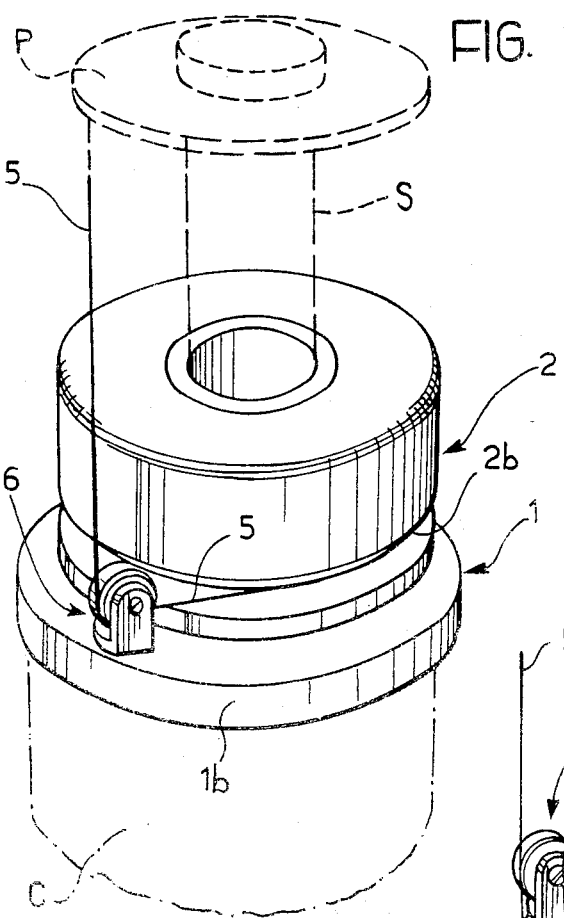

United States Patent [19]

Perga

[11] Patent Number: 4,718,683
[45] Date of Patent: Jan. 12, 1988

[54] LINEAR DISPLACEMENT-ELECTRICAL SIGNAL TRANSDUCER, PARTICULARLY FOR AUTOMATIC LEVELLING DEVICES FOR MOTOR VEHICLE SUSPENSIONS

[75] Inventor: Giampiero Perga, Leinì, Italy

[73] Assignee: Marelli Autronica S.p.A., Pavia, Italy

[21] Appl. No.: 744,437

[22] Filed: Jun. 13, 1985

[30] Foreign Application Priority Data

Aug. 14, 1984 [IT] Italy .................. 67818 A/84

[51] Int. Cl.$^4$ .................................................. B62D 37/00
[52] U.S. Cl. .................................. 280/6 R; 73/432.1; 280/DIG. 1
[58] Field of Search .............. 280/6 R, DIG. 1, 6 H, 280/611, 707; 33/1 PT; 73/112, 115, 432 A

[56] References Cited

U.S. PATENT DOCUMENTS

| | | | |
|---|---|---|---|
| 1,068,290 | 7/1913 | Willmann | 73/432 A |
| 1,114,362 | 10/1914 | Huttenlocher et al. | 73/432 A |
| 2,987,312 | 6/1961 | Alliquant | 280/DIG. 1 |
| 4,361,346 | 11/1982 | Harris | 280/DIG. 1 |
| 4,393,591 | 7/1983 | Conta | 33/1 PT |

FOREIGN PATENT DOCUMENTS 374207 2/1964 Switzerland .................. 33/1 PT

Primary Examiner—David M. Mitchell
Assistant Examiner—Ross Weaver
Attorney, Agent, or Firm—Sughrue, Mion, Zinn, Macpeak and Seas

[57] ABSTRACT

In order to detect relative linear displacements between two members, the transducer includes a fixed part or stator connectible to one of the members and a movable part or rotor rotatably supported by the fixed part. A flexible traction member has one end anchored to the other member and its other end connected to the rotor in such a way as to cause rotation of the latter in one sense relative to the stator when the members move away from each other. The transducer also includes a return spring which tends to rotate the rotor in the opposite sense of rotation when the two members move towards each other. Electrical sensor means output electrical signals indicative of the angular position of the rotor relative to the stator and hence of the relative position of the two members.

9 Claims, 12 Drawing Figures

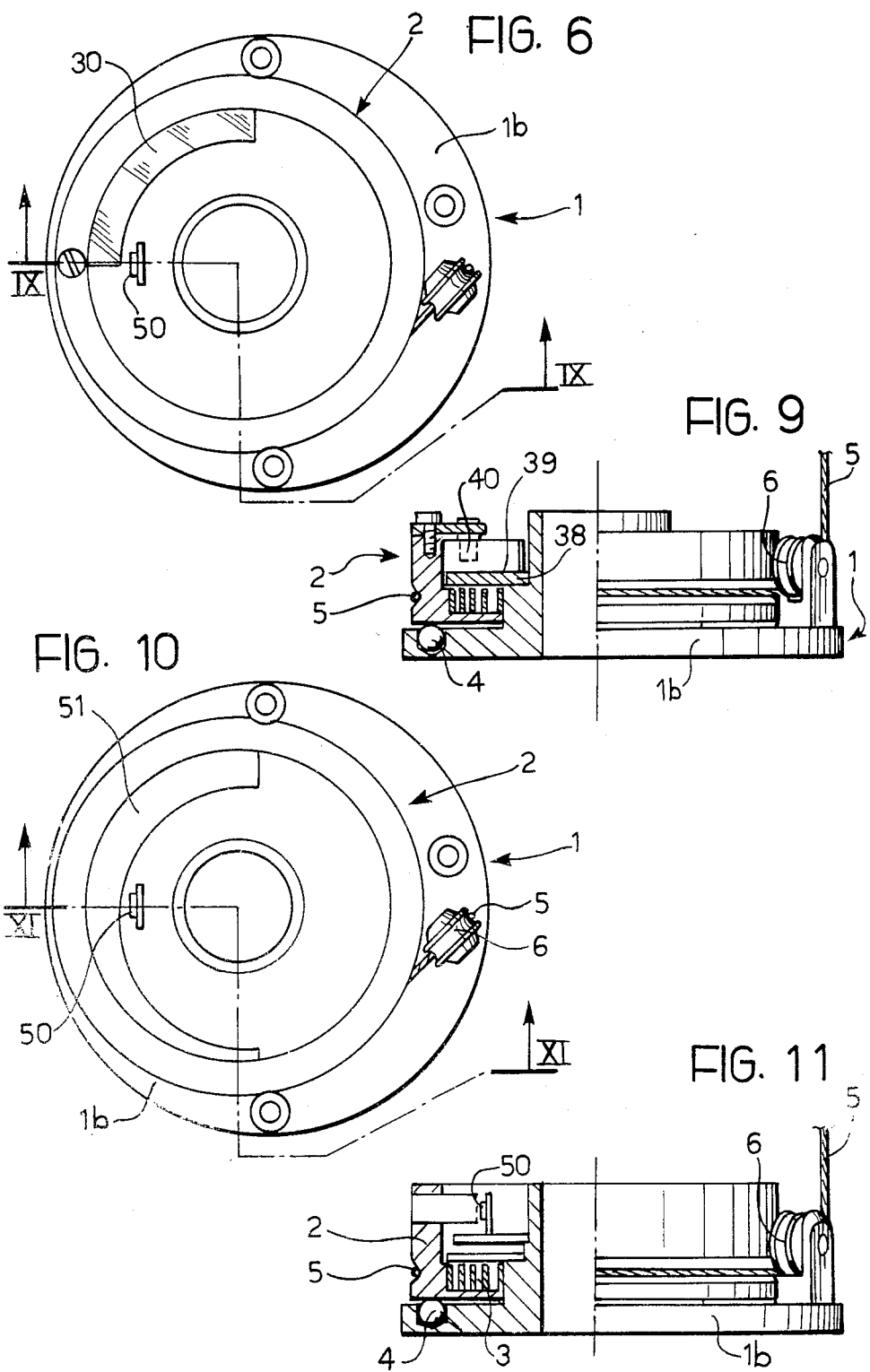

LINEAR DISPLACEMENT-ELECTRICAL SIGNAL TRANSDUCER, PARTICULARLY FOR AUTOMATIC LEVELLING DEVICES FOR MOTOR VEHICLE SUSPENSIONS

The present invention relates to an electrical transducer for relative linear displacements between two members, particularly for automatic levelling devices for motor vehicle suspensions.

The object of the invention is to provide an electrical transducer which is simple and cheap to manufacture and highly reliable.

This object is achieved according to the invention by means of a transducer characterised in that it comprises:
a fixed part or stator connectible to one of the two members,
a movable part or rotor rotatably supported by the fixed part,
a traction member having one end anchored to the other of the two members and its other end connected to the rotor in such a way as to cause its rotation in one sense relative to the stator when the members move away from each other,
resilient return means which tend to rotate the rotor in the opposite sense of rotation when the two members move towards each other, and
electrical sensor means for outputting electrical signals indicative of the angular position of the rotor relative to the stator.

Figure 2:
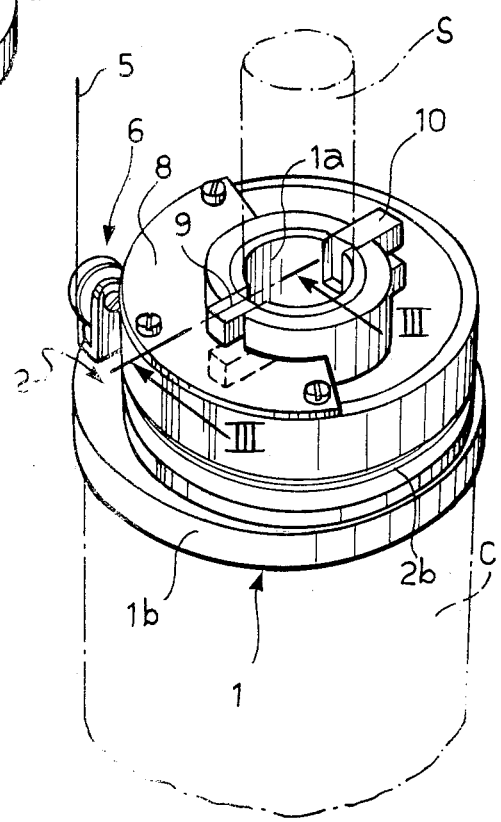
Figure 3:
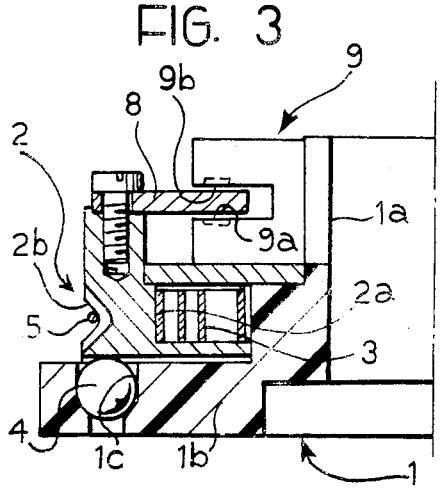
Figure 4:
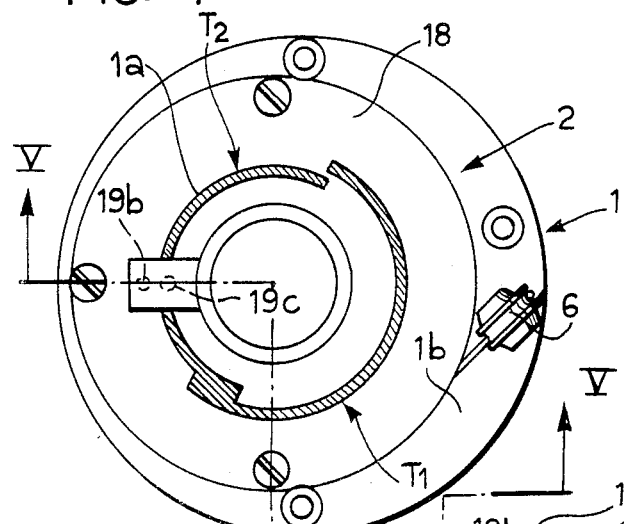
Figure 5:
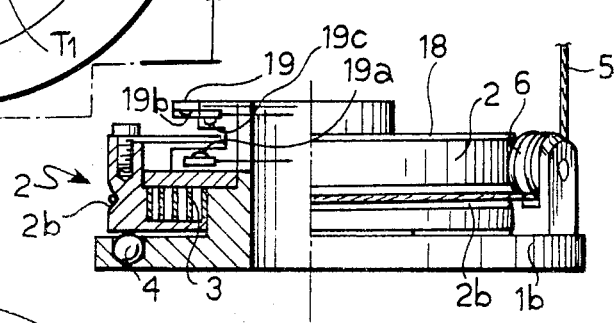
Figure 7:
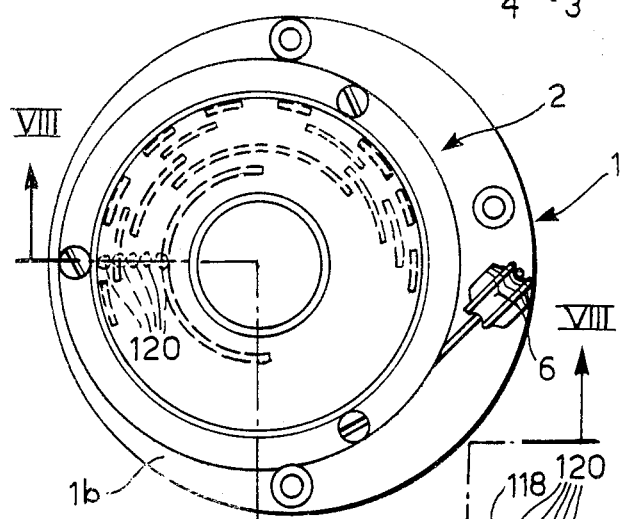
Figure 8:
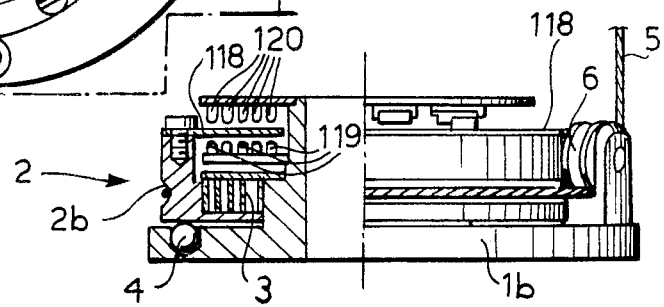
Figure 12:
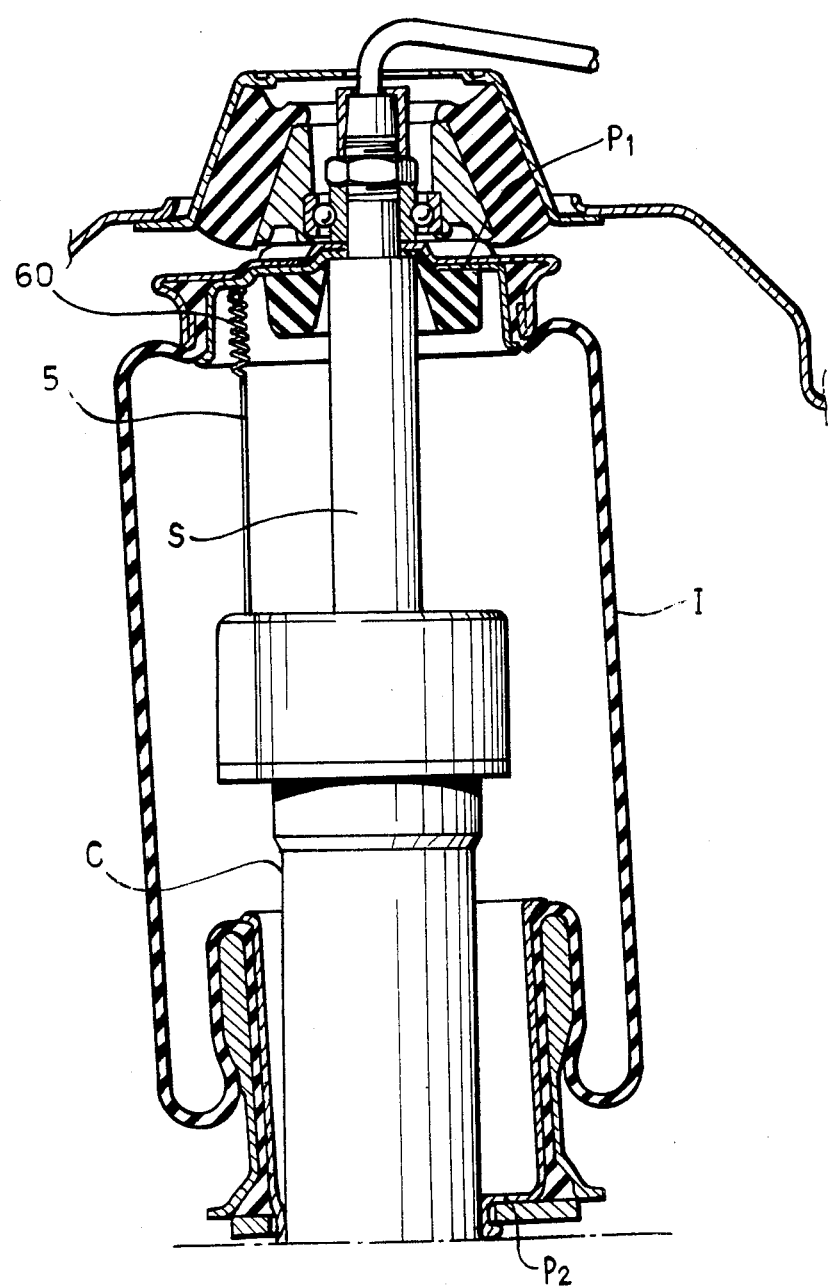

Further characteristics and advantages of the transducer according to the invention will be apparent from the detailed description which follows with reference to the appended drawings, provided purely by way of non-limiting example, in which:

FIG. 1 is a perspective view of a transducer according to the invention,

FIG. 2 is a perspective view of the transducer shown in FIG. 1 in a first embodiment, without its upper covering element, FIG. 3 is a partially-sectioned view taken on the line III—III of FIG. 2, FIG. 4 is a plan view of a variant of the sensor according to the invention, FIG. 5 is a partially-sectioned view taken on the line V—V of FIG. 4, FIG. 6 is a plan view of a variant of the transducer, FIG. 7 is a plan view of a further variant of the transducer according to the invention, FIG. 8 is a partially-sectioned view taken on the line VIII—VIII of FIG. 7, FIG. 9 is a partially-sectioned elevational view of another variant of the transducer according to the invention, FIG. 10 is a plan view of a further variant of the transducer according to the invention, FIG. 11 is a partially-sectioned elevational view taken on line XI—XI of FIG. 9, and FIG. 12 is a sectional view of part of a motor vehicle suspension equipped with a transducer according to the invention.

With reference to FIGS. 1 to 3, in a first embodiment a transducer according to the invention comprises a fixed part or stator 1 and a movable part or rotor 2 supported rotatably by the fixed part. The stator 1 has a tubular portion 1a (FIGS. 2 and 3) and an outer radial flange 1b. The rotor 2 is annular and is rotatable about the tubular portion of the stator. This rotor has a recess 2a which houses a coil spring 3 (FIG. 3) having one end fixed to the tubular portion 1a of the stator and its other end anchored to the rotor.

In the flange 1b of the stator is formed an annular seat 1c for balls 4 intended to facilitate the relative sliding movement between the rotor and the stator (FIG. 3).

A metal or nylon traction cable, indicated 5, has one end fixed to the rotor 2 by connecting means, which include an annular groove 2b and a small pulley 6 mounted on. On the upper part of the stator flange 1b with its axis parallel to the plane of this flange, to ensure the return of the traction cable 5.

During use, the stator 1 is fixed to a first member while the free end of the traction cable 5 is fixed to a second member whose displacement relative to the first is to be detected. In the application illustrated in FIG. 1, the stator is connected to one end of the cylinder C of a telescopic shock-absorber, while the traction cable 5 is connected to a washer P fixed to the shaft S of the shock-absorber. This shaft passes through the tubular portion 1a of the stator in a translatable manner. When the shock-absorber extends, that is lengthens, the traction cable 5 causes a rotation of the rotor 2 relative to the stator 1. When the shock-absorber contracts, however, the spring 3 tends to rotate the rotor 2 in the opposite direction relative to the stator, and the traction cable 5 is thus wound onto the rotor in the annular groove 2b. A relative displacement between the shaft S and the cylinder C causes a corresponding rotation of the rotor relative to the stator.

Conveniently, the circumference of the groove 2b in the rotor corresponds to the maximum length of the relative linear displacement to be detected.

In order to detect the relative rotation between the rotor and the stator in the embodiment shown in FIGS. 1 to 3, the upper part of the rotor 2 carries a ring-sector 8 of opaque material and the stator 1 carries, in the upper part of the tubular portion 1a, two "forks" 9 and 10 the arms of which are positioned on opposite sides of the plane of the sector 8 and respectively accommodate a photoemitter and a photodetector which face each other. The photoemitter may be constituted, for example, by a light-emitting diode, while the photodetector may be constituted by a phototransistor. These are indicated 9a and 9b respectively in FIG. 3. The outputs of the two photodetectors may be considered as the (two-bit digital) output of the transducer.

The transducer shown in FIGS. 1 to 3, if used in an automatic levelling system of a motor vehicle for signalling any variations in the attitude thereof, may indicate, for example, whether the height of the body from the ground falls within a pre-established range (the extent of this range being correlated with the angular extent of the sector 8), or whether such a height is outside the pre-established range. In the latter case, the transducer can indicate whether the value of the height is above or below the pre-established range.

FIGS. 4 and 5 illustrate a simple variant of the transducer shown in FIGS. 1 to 3. According to this variant, instead of two photoemitter-photodetector "forks", a single fork, indicated 19, is used which carries a photoemitter 19a in its lower arm and two photodetectors 19b and 19c in radially offset positions (FIG. 5) in its upper arm. With this "fork" there cooperates a ring 18 of transparent material, upon which opaque tracks such as those indicated $T_1$ and $T_2$ in FIG. 4 are deposited, for example by serigraphy. These tracks are at a radial distance from the axis of rotation of the rotor substantially equal to the radial distance separating this axis from the two photodetectors 19b, 19c. In this case also, the transducer has two outputs (the outputs of the photodetectors) and is therefore a two-bit device.

FIG. 6 shows a further variant of the transducer according to the invention, in which a Hall-effect sensor 50 is fixed to the stator 1 and a magnet 30 in the form of a ring-sector is fixed to the rotor 2: in this case, the acceptable range of relative positions of the two members is defined by the intrinsic hysteresis of the sensor, while the extreme positions of this range are correlated to those conditions in which the magnet 30 is or is not in front of the sensor 50. FIGS. 7 and 8 illustrate a variant of the transducer according to the invention with a five-bit output. As photoemitters 119 (which could be replaced by a single photoemitter of suitable size) are firmly connected to the stator 1 in radially adjacent positions and cooperate with five photodetectors 120 which face them in an ordered array. Between the photoemitters 119 and the photodetectors 120 extends a ring 118 of transparent material fixed to the rotor 2. This ring has opaque and transparent sectors arranged according to a pre-established code in positions situated at radial distances from the axis of rotation of the rotor corresponding to the radial distances of the photodetectors 120. These opaque sectors are shown by phantom lines in FIG. 7.

In substance, the disc or ring 118, the photoemitters 119 and the photodetectors 120 together constitute a rotary optical encoder for detecting relative angular displacements between the rotor 2 and the stator 1. FIG. 9 shows a first "analog" version of the transducer according to the invention. In this version, a ring 38 carrying a track of resistive material, for example a thick-film resistor, indicated 39, on its upper surface is fixed to the stator 1. A sliding-contact member 40 is fixed to the rotor 2 in contact with the resistive track 39. This track and the contact member 40 together constitute a rotary potentiometer. If a potential difference is applied to the resistive element 39, the voltage between the brush 40 and one end of the resistive track 39 is a univocal function of the angular position of the rotor relative to the stator.

FIGS. 10 and 11 illustrate a second variant of an "analog" embodiment of the transducer according to the invention. In this variant, an outwardly-facing Hall-effect sensor 50 is fixed to the stator 1. A magnet 51 in the form of a ring-sector is fixed to the rotor 2, facing the sensor 50. The magnet 51, which is constituted, for example, by a magnetoferrite, has a variable thickness in the radial direction of the rotor so that, from one of its ends to the other, its inner surface has a progressively increasing (or decreasing) radial spacing from the axis of rotation of the rotor. Consequently, when the rotor rotates relative to the stator, the signal output by the Hall-effect sensor 50 varies.

FIG. 12 shows a possible assembly of a transducer according to the invention, for detecting the degree of sliding of the shaft S relative to the cylinder C of a shock-absorber of a motor vehicle equipped with an automatic levelling system. In known manner, variable-stiffness air springs, such as that illustrated in FIG. 12, arranged around the shock-absorber itself are used to effect the automatic levelling. In the embodiment shown in FIG. 12, the air spring comprises a flexible tubular casing I connected at its ends to two washers P1 and P2, of which the first, being fixed to the shaft S of the shock-absorber, is connected to the body, while the second, being fixed to the cylinder C of the shock-absorber, is connected to a wheel.

Conveniently, the transducer according to the invention is mounted within the casing I of the air spring: this casing therefore serves as a cover for the transducer. The traction cable 5 is connected to the upper washer by means of a very stiff spring 60. The electrical conductors for supplying and taking the signals from the transducer pass, for example, through at least one hole formed in the lower washer (in a manner not shown).

In some automatic levelling systems for motor vehicles, air springs are not always located around the respective shock-absorbers: in this case, the transducer may be mounted on the shock-absorber, as illustrated in FIG. 1, or it may be mounted within an air spring with the stator rigid with one of the end washers and the traction cable connected to the other washer.

I claim:
1. An electrical transducer for detecting relative linear displacements between first and second members comprising:
   a stator connectable to said first member;
   a rotor rotatably supported by said stator;
   a flexible traction member having one end adapted to be anchored to said second member and its other end attached to said rotor;
   connecting means for attaching the other end of said traction member to said rotor wherein said rotor rotates in one direction relative to said stator when said first and second members are displaced away from each other;
   resilient return means for rotating said rotor in the opposite direction of rotation when the two members are displaced towards each other; and
   electrical sensor means for outputting electrical signals indicative of the angular position of the rotor relative to the stator, wherein the sensor means comprise a Hall-effect sensor fixed to the stator and a magnet carried by the rotor and facing said sensor; and
   said magnet is positioned relative to the axis of rotation of the rotor at a radial distance that is variable in a predetermined manner.

2. A transducer according to claim 1, wherein a return member for the flexible traction member is connected to the stator.

3. A transducer according to claim 2, wherein the rotor has a groove in its periphery and the winding of the flexible traction member being received in said groove.

4. A transducer according to claim 3, wherein the flexible traction member comprises a metal cable.

5. A transducer according to claim 4, wherein the flexible traction member comprises a nylon cable.

6. A transducer according to claim 5, wherein the resilient return means comprise a coil spring.

7. An automatic levelling device for a motor vehicle, comprising;
   electrical means for sensing variations in the attitude of the motor vehicle;
   suspension means for supporting the vehicle including first and second members;
   a variable-stiffness air spring enclosing said suspension means and extensible in a manner controlled in dependence on the signals output by the means for sending variations in attitude;

the means for sensing variations in attitude comprising, for each suspension means monitored, a transducer device comprising;

a stator connected to said first member;

a rotor rotatably supported by said stator;

a flexible traction member having one end anchored to said second member and its other end attached to said rotor;

connecting means for attaching the other end of said traction member to said rotor wherein said rotor rotates in one direction relative to said stator when said first and second members are displaced away from each other;

resilient return means for rotating said rotor in the opposite direction of rotation when the two members are displaced towards each other; and electrical sensor means for outputting electrical signals indicative of the angular position of the rotor relative of the stator, wherein the sensor means comprises a Hall-effect sensor fixed to the stator and a magnet carried by the rotor and facing said sensor and wherein said magnet is positioned relative to the axis of rotation of the rotor at a radial distance that is variable in a predetermined manner.

8. An automatic levelling device according to claim 7, wherein for each suspension means monitored, a transducer is mounted in within the air spring.

9. An automatic levelling device according to claim 8, wherein each suspension means comprise;

a shock-absorber having said first and second members that are telescopically slidable relative to one another, and wherein the transducer has its stator fixed to the first member of the shock-absorber and the flexible traction member connected to the second member of the shock-absorber.

* * * * *